US 11,995,898 B2

(12) United States Patent
Nakamura

(10) Patent No.: US 11,995,898 B2
(45) Date of Patent: May 28, 2024

(54) OCCUPANT MONITORING DEVICE FOR VEHICLE

(71) Applicant: SUBARU CORPORATION, Tokyo (JP)

(72) Inventor: Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 109 days.

(21) Appl. No.: 17/671,954

(22) Filed: Feb. 15, 2022

(65) Prior Publication Data
US 2022/0270381 A1 Aug. 25, 2022

(30) Foreign Application Priority Data
Feb. 24, 2021 (JP) .................... 2021-027735

(51) Int. Cl.
*G06V 20/59* (2022.01)
*G06F 3/042* (2006.01)
*G06F 3/04883* (2022.01)
*H04N 23/611* (2023.01)

(52) U.S. Cl.
CPC .......... *G06V 20/597* (2022.01); *G06F 3/0425* (2013.01); *G06F 3/04883* (2013.01); *H04N 23/611* (2023.01)

(58) Field of Classification Search
CPC .. G06V 20/597; H04N 23/611; G06F 3/0425; G06F 3/04883
USPC ........................................................ 348/77
See application file for complete search history.

(56) References Cited

U.S. PATENT DOCUMENTS

| | | | |
|---|---|---|---|
| 10,891,502 B1* | 1/2021 | Chan ................... | G06V 20/597 |
| 2012/0093360 A1* | 4/2012 | Subramanian ....... | G06V 10/143 |
| | | | 382/103 |
| 2012/0293551 A1* | 11/2012 | Momeyer ............. | G06F 3/0488 |
| | | | 345/174 |
| 2013/0335213 A1* | 12/2013 | Sherony ............... | B60W 30/12 |
| | | | 340/439 |
| 2014/0300571 A1* | 10/2014 | Tomizu ............... | G06F 3/04883 |
| | | | 345/173 |
| 2015/0355812 A1* | 12/2015 | Onishi ................ | G06F 3/04842 |
| | | | 715/762 |
| 2017/0300162 A1* | 10/2017 | Jang .................... | G06V 20/593 |
| 2017/0351373 A1* | 12/2017 | Ueno .................. | G06F 3/04845 |
| 2020/0019252 A1* | 1/2020 | Okabe ................ | G06F 3/0346 |
| 2021/0009036 A1* | 1/2021 | Kosugi ............... | H04N 5/265 |

(Continued)

FOREIGN PATENT DOCUMENTS

| | | | |
|---|---|---|---|
| JP | 2019-014359 A | | 1/2019 |
| JP | 2019-014360 A | | 1/2019 |

*Primary Examiner* — John W Miller
*Assistant Examiner* — Omer Khalid
(74) *Attorney, Agent, or Firm* — Rimon P.C.

(57) ABSTRACT

An occupant monitoring device for a vehicle includes a display, a controller, and an imager. The display is configured to display an operation screen for an occupant in the vehicle. The controller is configured to execute control based on an operation type determined as an operation performed by the occupant on the operation screen of the display. The imager is configured to image the occupant in the vehicle. The controller is configured to avoid executing the control based on the determined operation type in a case where the operation type performed by the occupant at least involves movement toward the imager.

17 Claims, 10 Drawing Sheets

(56) References Cited

U.S. PATENT DOCUMENTS

2021/0009141 A1\* 1/2021 Lu .................. G06V 20/597
2021/0331689 A1\* 10/2021 Heo ................. G06V 40/20

\* cited by examiner

OCCUPANT MONITORING DEVICE FOR VEHICLE

CROSS-REFERENCE TO RELATED APPLICATIONS

The present application claims priority from Japanese Patent Application No. 2021-027735 filed on Feb. 24, 2021, the entire contents of which are hereby incorporated by reference.

BACKGROUND

The disclosure relates to an occupant monitoring device for a vehicle.

In the field of vehicles, for example, a liquid crystal device including a touch panel is employed as a display for settings about a vehicle, that is, as a user interface. For example, this liquid crystal device displays operation objects such as buttons.

An occupant in the vehicle operates any operation object displayed on this liquid crystal device. A controller of the vehicle executes control depending on a type of operating action (hereinafter referred to as "operation type").

This liquid crystal device allows various types of operation such as clicking on the operation object and swiping on the surface of the liquid crystal device as typified in mobile terminals. The occupant is familiar with those types of operation on mobile terminals.

In the field of vehicles, conditions of occupants may be monitored during driving assistance and autonomous driving (Japanese Unexamined Patent Application Publication Nos. 2019-014359 and 2019-014360).

To monitor occupants in the vehicle, the vehicle includes an imaging device on, for example, a dashboard in front of the occupants, and conditions of the occupants are determined based on an image captured by the imaging device.

SUMMARY

An aspect of the disclosure provides an occupant monitoring device for a vehicle. The occupant monitoring device includes a display, a controller, and an imager. The display is configured to display an operation screen for an occupant in the vehicle. The controller is configured to execute control based on an operation type determined as an operation performed by the occupant on the operation screen of the display. The imager is configured to image the occupant in the vehicle. The controller is configured to avoid executing the control based on the determined operation type in a case where the operation type performed by the occupant at least involves movement toward the imager.

An aspect of the disclosure provides an occupant monitoring device for a vehicle. The occupant monitoring device includes a display, an imager, and circuitry. The display is configured to display an operation screen for an occupant in the vehicle. The imager is configured to image the occupant in the vehicle. The circuitry is configured to execute control based on an operation type determined as an operation performed by the occupant on the operation screen of the display. The circuitry is configured to avoid executing the control based on the determined operation type in a case where the operation type performed by the occupant at least an operation involves movement toward the imager.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
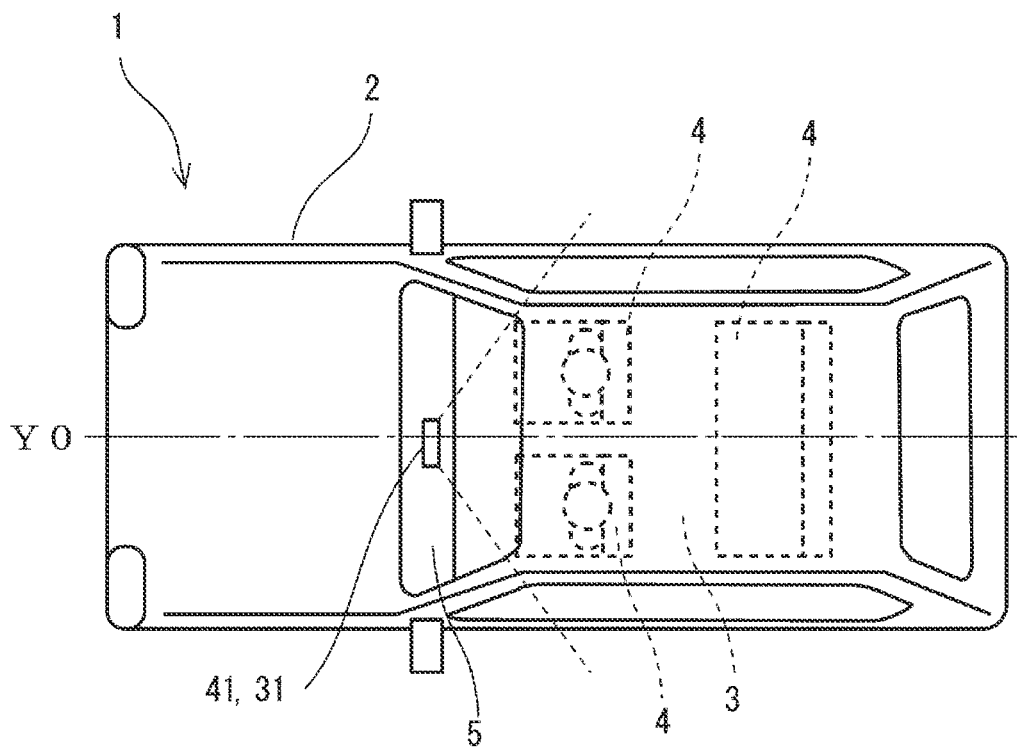
FIG. 1 is a diagram illustrating an automobile including an occupant monitoring device according to an embodiment of the disclosure.

An imaging device may be provided near a liquid crystal device including a touch panel in a vehicle.

Therefore, the imaging device can capture a frontal image of an occupant viewing a predetermined screen displayed on the liquid crystal device. When frontal image data of the occupant is provided in advance, the frontal image data is compared with, for example, current captured image data to determine conditions of the occupant such as a driver with higher probability.

When the imaging device is provided near the liquid crystal device serving as a display, the field of view of the imaging device may be obstructed by any one of the finger, hand, arm, and elbow of the monitored occupant who is, for example, swiping on the liquid crystal device. For example, when monitoring conditions of a plurality of occupants including a driver in a front row based on captured image data obtained by a single imaging device, the imaging device may be provided at the center of a body in a vehicle width direction together with the liquid crystal device including the touch panel. In this case, the field of view of the imaging device may be obstructed by any one of the finger, hand, arm, and elbow of an occupant who is swiping. There is a possibility that the conditions of the occupant cannot be monitored when the occupant cannot be imaged.

In the liquid crystal device including the touch panel in the vehicle, swiping may be restricted in any case and other actions such as clicking may be permitted. When the swiping is restricted in any case, the occupant may repeat clicking and other actions. The occupant may refrain from operating the liquid crystal device by swiping. The occupant may be familiar with swiping on mobile terminals but refrain from using the swiping when operating an operation screen of the vehicle. There is a possibility of a decrease in usability of the liquid crystal device including the touch panel in the vehicle.

It is desirable that the display that displays the operation screen for occupants in the vehicle and is used for monitoring the occupants in combination with an imager can satisfactorily achieve both the usability for the occupants and the monitoring of occupants' conditions.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 is a diagram illustrating an automobile 1 including an occupant monitoring device 15 according to an embodiment of the disclosure.

The automobile 1 is an example of a vehicle. The automobile 1 may use an internal combustion engine, battery power, or a combination thereof as a traveling power source.

In FIG. 1, a body 2 of the automobile 1 has a cabin 3. The cabin 3 includes a plurality of front seats 4 as a driver's seat and a passenger's seat, and an elongated rear seat 4. Occupants including a driver sit on the seats 4. A dashboard 5 extending along a vehicle width direction of the body 2 is provided at the front of the cabin 3 that is an area in front of the front seats 4.

Figure 2:
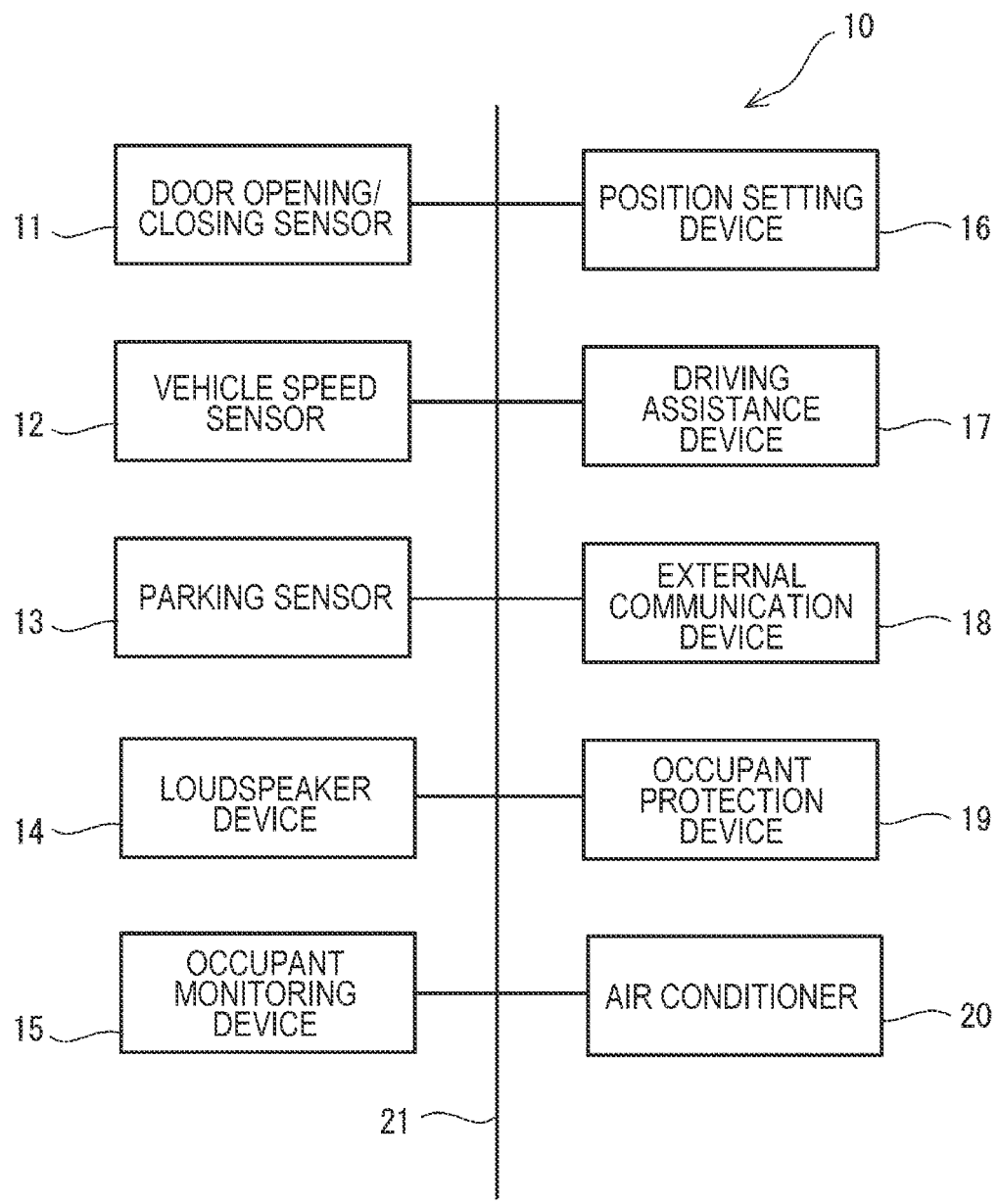
FIG. 2 is a diagram illustrating a control device of the automobile in FIG. 1.

FIG. 2 is a diagram illustrating a control device 10 of the automobile 1 in FIG. 1.

In FIG. 2, the control device 10 includes a door opening/closing sensor 11, a vehicle speed sensor 12, a parking sensor 13, a loudspeaker device 14, the occupant monitoring device 15, a position setting device 16, a driving assistance device 17, an external communication device 18, an occupant protection device 19, an air conditioner 20, and an internal network 21 that couples those devices.

The internal network 21 may be a wired communication network such as a controller area network (CAN) and a local interconnect network (LIN) for the automobile 1. The internal network 21 may be a communication network such as a LAN, or a combination of those networks. A part of the internal network 21 may be a wireless communication network.

The door opening/closing sensor 11 detects opening and closing motions of doors of the automobile 1.

The vehicle speed sensor 12 detects a speed of the traveling automobile 1. The vehicle speed sensor 12 may detect a stopped state.

The parking sensor 13 detects a parked state in which the automobile 1 remains stopped. For example, the parking sensor 13 may detect the parked state based on either one of an operation on a select lever of transmission (not illustrated) for a parking position and an operation on a parking lever (not illustrated) for a braking position.

The occupant monitoring device 15 executes a process for recognizing an occupant in the cabin 3, for example, when the door opening/closing sensor 11 detects an opening or closing motion of the door.

When the occupant monitoring device 15 recognizes a plurality of occupants, the occupant monitoring device 15 may monitor the occupants individually.

The occupant monitoring device 15 may output information on the recognized occupants and information based on the monitoring to the individual parts of the control device 10 via the internal network.

For example, the occupant monitoring device 15 recognizes a driver on the driver's seat 4, and monitors either one of inattentive driving and drowse of the recognized driver. When the driver is in a predetermined state, the occupant monitoring device 15 executes control to caution the driver or avoid danger. The occupant monitoring device 15 may output information on the driver, information on the caution, and information on the danger avoidance to the individual parts of the control device 10 via the internal network.

For example, the loudspeaker device 14 outputs voice and alert sound. The loudspeaker device 14 may output alert generated for the driver and other occupants by the occupant monitoring device 15.

For example, the position setting device 16 adjusts longitudinal and vertical positions of the seats 4, angles of back rests, longitudinal and vertical positions and an angle of a steering wheel, and longitudinal and vertical positions and angles of various pedals. The position setting device 16 changes the positions of the seats based on occupant information output from the occupant monitoring device 15.

The driving assistance device 17 assists either one of driver's manual driving operations on the automobile 1 and autonomous driving operations of the automobile 1. The driving assistance device 17 controls acceleration, deceleration, stop, and steering of the automobile 1. The driving assistance device 17 executes driving assistance depending on the driver based on driver information output from the occupant monitoring device 15.

For example, the external communication device 18 establishes wireless communication channels with a base station on a public wireless communication network, a base station on a commercial wireless communication network, and a base station for advanced traffic information, and executes data communication by using the established wireless communication channels. For example, the external communication device 18 may execute interactive data communication with a server that assists autonomous driving. The external communication device 18 may transmit information on occupants including the driver from the occupant monitoring device 15 to the server as, for example, emergency assistance information.

The occupant protection device 19 executes occupant protection control when collision of the automobile 1 is detected or predicted. For example, the occupant protection device 19 protects an occupant on the seat 4 by inflating an airbag (not illustrated) or applying tension to a seatbelt. The occupant protection device 19 may protect the occupant based on the occupant information output from the occupant monitoring device 15.

The air conditioner 20 controls a temperature and an oxygen concentration in the cabin 3. For example, the air conditioner 20 adjusts the temperature in the cabin 3 to a set temperature by supplying cooled or heated air to the cabin 3. The air conditioner 20 may condition air based on the occupant information output from the occupant monitoring device 15.

For example, the occupant can ride with comfort under the occupant's settings through the control based on the occupant information output from the occupant monitoring device 15. For example, the driver can concentrate on driving of the automobile 1.

Figure 3:
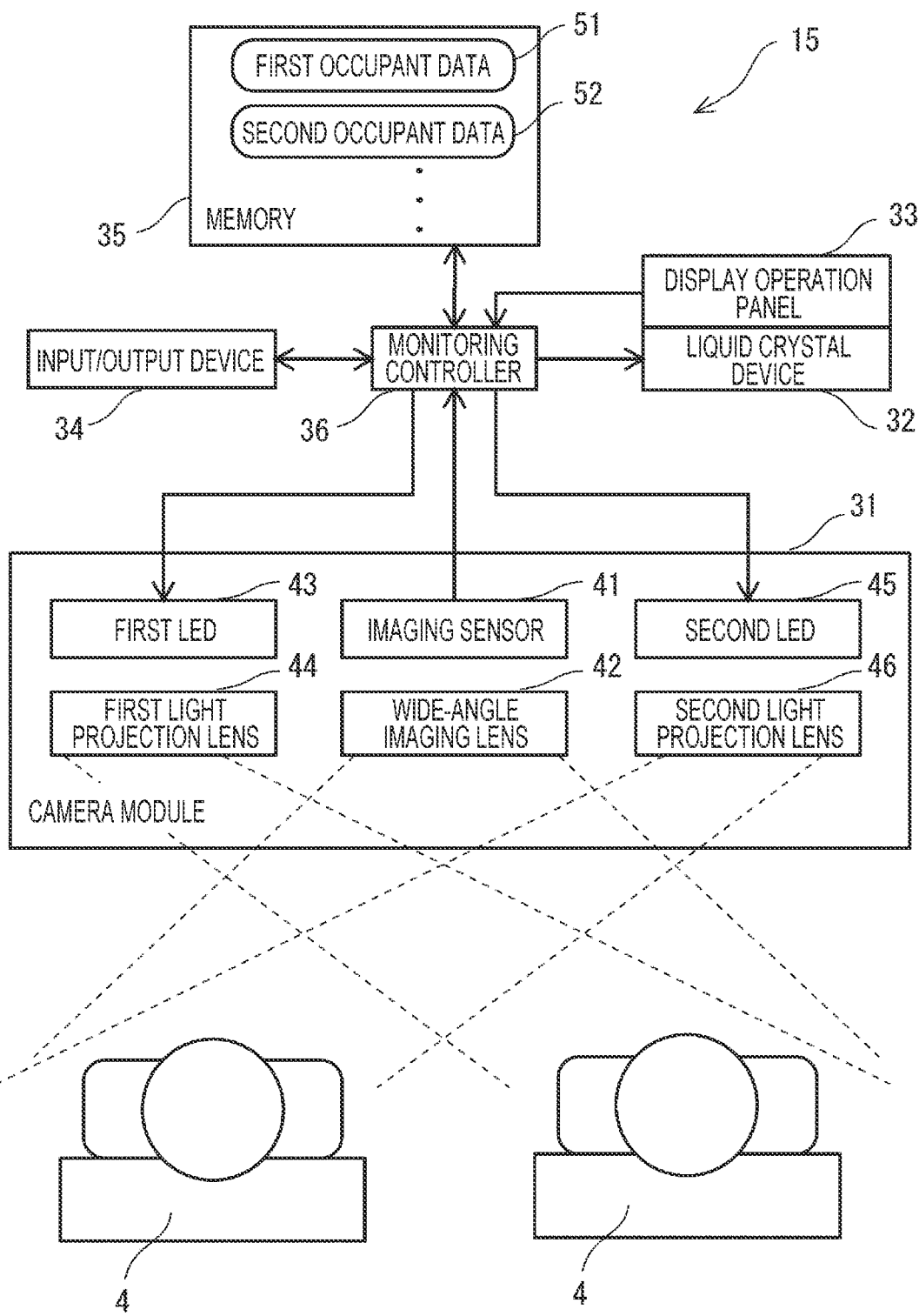
FIG. 3 is a diagram illustrating the occupant monitoring device of the automobile in FIG. 2.

FIG. 3 is a diagram illustrating the occupant monitoring device 15 of the automobile 1 in FIG. 2. In FIG. 3, the occupant monitoring device 15 monitors not only the driver but also, for example, a plurality of occupants on the front seats 4. In FIG. 3, the occupant monitoring device 15 includes a camera module 31, a liquid crystal device 32 including a display operation panel 33, an input/output device 34, a memory 35, and a monitoring controller 36 coupled to those devices.

The input/output device 34 is coupled to the internal network 21. The input/output device 34 inputs data from and outputs data to the other parts in the automobile 1 via the internal network 21.

The liquid crystal device 32 displays an image on a display surface of the display operation panel 33. The liquid crystal device 32 displays a screen to be viewed by each occupant in the automobile 1. In one embodiment, the liquid crystal device 32 may serve as a "display". Examples of the display surface include an operation screen to be operated by the occupant.

The display operation panel 33 is a transparent or semi-transparent panel laid over the display surface of the liquid crystal device 32. The display operation panel 33 is laid over the display surface of the liquid crystal device 32. In one embodiment, the display operation panel 33 may serve as a "display". The display operation panel 33 detects an occupant's operation on the display surface of the liquid crystal device 32. The display operation panel 33 may output a point of the occupant's operation on the display surface of the liquid crystal device 32 to the monitoring controller 36.

The camera module 31 images a plurality of occupants on the front seats 4. The camera module 31 includes an imaging sensor 41, a wide-angle imaging lens 42, a first LED 43, a first light projection lens 44, a second LED 45, and a second light projection lens 46.

The imaging sensor 41 is an optical semiconductor sensor such as a CCD or CMOS sensor. For example, the imaging sensor 41 may have a substantially quadrangular light receiving surface where a plurality of light receiving elements are arrayed. The imaging sensor 41 may output captured image data including captured images to the monitoring controller 36.

The wide-angle imaging lens 42 is laid over the imaging sensor 41. The wide-angle imaging lens 42 may include a plurality of optical lenses to suppress distortion at the edge of each image.

The imaging sensor 41 and the wide-angle imaging lens 42 image a plurality of occupants in the automobile 1 to monitor conditions of the occupants. In one embodiment, the imaging sensor 41 and the wide-angle imaging lens 42 may serve as an "imager".

The wide-angle imaging lens 42 may be such that either one of upper bodies and heads of a plurality of occupants on the front seats 4 can be imaged with the imaging sensor 41 provided, for example, at the center of the dashboard 5 in the vehicle width direction.

The first LED 43 and the second LED 45 may be semiconductor light emitting elements. In one example, the first LED 43 and the second LED 45 may serve as a light projector to project light toward occupants in the automobile 1 to be imaged by the imaging sensor 41. For example, the first LED 43 and the second LED 45 may project infrared rays. In this case, the imaging sensor 41 outputs captured image data including images captured by using the infrared rays to the monitoring controller 36. The first light projection lens 44 is laid over the first LED 43. The first light projection lens 44 may radiate light from the first LED 43 mainly toward the driver on the driver's seat 4. The second light projection lens 46 is laid over the second LED 45. The second light projection lens 46 may radiate light from the second LED 45 mainly toward an occupant on the passenger's seat 4. The second light projection lens 46 may diffuse and project light toward the occupant on the passenger's seat 4 and the driver on the driver's seat 4.

The memory 35 stores programs and data. The memory 35 may include a non-volatile memory and a volatile memory. Examples of the non-volatile memory include an HDD, an SSD, and an EEPROM. Examples of the volatile memory include a RAM.

In the memory 35 of the occupant monitoring device 15, pieces of data on a plurality of occupants registered in the automobile 1 may be recorded while being managed for the individual occupants. FIG. 3 illustrates first occupant data 51 on a first occupant and second occupant data 52 on a second occupant. The plurality of pieces of occupant data constitute a database in the memory 35.

The occupant data such as the first occupant data 51 and the second occupant data 52 may include identification information unique to the occupant, registered captured image data obtained by imaging, for example, the head and eyes of the occupant by the imaging sensor 41, and various types of setting data on settings made by the occupant. For example, the setting data may include information on a position of the occupant's seat, an initial setting about ON/OFF of driving assistance, preferences on autonomous driving, a server to be used, and settings about occupant protection and air conditioning.

In one example, the memory 35 may serve as a recorder to record, as registered captured image data of each occupant, captured image data obtained by imaging a frontal view of the occupant by the imaging sensor 41 while a predetermined screen is displayed on the liquid crystal device 32.

The memory 35 may record occupant data about general unregistered occupants.

Examples of the monitoring controller 36 include an ECU, a CPU, and other microcomputers.

The monitoring controller 36 reads and executes a program in the memory 35. Thus, the monitoring controller 36 is implemented as a controller of the occupant monitoring device 15. The monitoring controller 36 may execute control depending on an operation type determined as an occupant's operation on the operation screen of the liquid crystal device 32.

The monitoring controller 36 monitors conditions of a plurality of occupants in the automobile 1 based on captured image data obtained by the imaging sensor 41. For example, the monitoring controller 36 executes a registration process and a monitoring process for an occupant in the automobile 1 to monitor the occupant. The monitoring controller 36 may identify occupants in the automobile 1, and execute the monitoring process for each identified occupant. The monitoring controller 36 determines conditions of at least the driver, such as inattentive driving, drowse, and emergency, by using his/her registered captured image data in the memory 35 as determination reference data. In one embodiment, the monitoring controller 36 may serve as a "determiner".

Figure 4A:
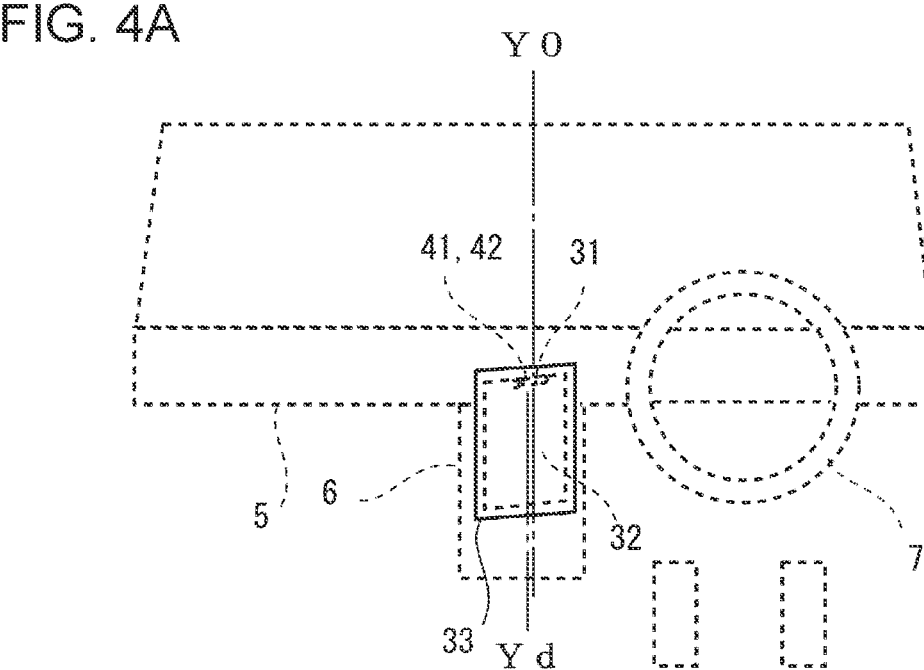
FIGS. 4A and 4B are diagrams illustrating internal disposition of a liquid crystal device including a display operation panel and a camera module including an imaging sensor in the occupant monitoring device in FIG. 3.
Figure 4B:
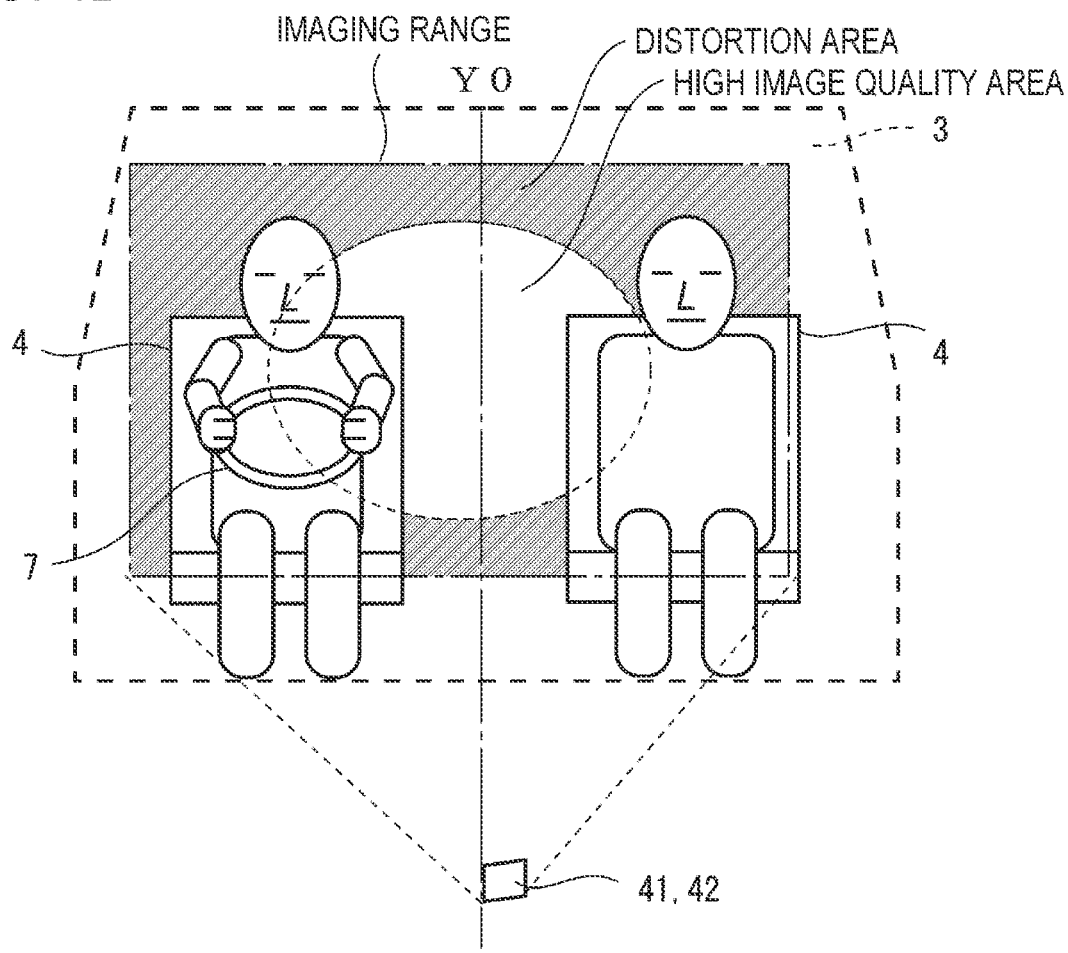

FIGS. 4A and 4B are diagrams illustrating internal disposition of the liquid crystal device 32 including the display operation panel 33 and the camera module 31 including the imaging sensor 41 in the occupant monitoring device 15 in FIG. 3.

FIG. 4A illustrates the dashboard 5 and a center console 6 at the front of the cabin 3.

For example, as illustrated in FIG. 1, the liquid crystal device 32 and the camera module 31 of this embodiment are disposed in a vertically oriented posture at the center of the automobile 1 in the vehicle width direction to extend from the dashboard 5 to the center console 6. Thus, the imaging sensor 41 of the camera module 31 can image the driver and the passenger at a wide angle. The imaging sensor 41 may image the driver's upper body including the head and the passenger's upper body including the head.

The liquid crystal device 32 may be disposed at the center of the automobile 1 in the vehicle width direction so that a center position Yd of the display screen in the vehicle width direction agrees with a center position Y0 of the automobile 1 in the vehicle width direction. In this embodiment, the center position Yd of the display screen in the vehicle width direction is slightly shifted away from the driver relative to the center position Y0 of the automobile 1 in the vehicle width direction.

At this position, the liquid crystal device 32 is inclined toward the driver relative to the vehicle width direction. The display screen of the liquid crystal device 32 can achieve a high driver's visibility while securing passenger's visibility.

FIG. 4B is a diagram illustrating a cabin imaging range of the camera module 31 including the imaging sensor 41 and the wide-angle imaging lens 42 and inclined at a shifted position around the center of the automobile 1 in the vehicle width direction.

The wide-angle imaging lens 42 is laid over the imaging sensor 41. Thus, the imaging sensor 41 can image the entire cabin 3 as in the imaging range illustrated in FIG. 4B. The imaging sensor 41 is disposed at the center of the automobile 1 in the vehicle width direction, and can image the head of the driver and the head of the passenger on the front seats 4.

When the wide-angle imaging lens 42 is combined with the imaging sensor 41 to image a plurality of occupants, an image at the center of the imaging range corresponds to a high image quality area with less distortion, and an image at the edge of the imaging range corresponds to a distortion area with more distortion than at the center. When the occupant is seated near the right or left end in the vehicle width direction, it may be difficult to image the head of the occupant without distortion. When determination is made based on, for example, whether the eyes of the occupant are open or closed, there is a possibility that the determination cannot be made correctly.

In this embodiment, the display operation panel 33 is inclined toward the driver relative to a longitudinal direction of the body 2. Thus, the high image quality area at the center of the image captured by the imaging sensor 41 is shifted toward the driver. The imaging sensor 41 is likely to image the driver in the high image quality area at the center of the captured image rather than the distortion area on the periphery.

It is expected that the driver can be imaged with less distortion.

FIGS. 5A to 5D are diagrams illustrating how the driver of the automobile 1 is imaged.

Figure 5A:
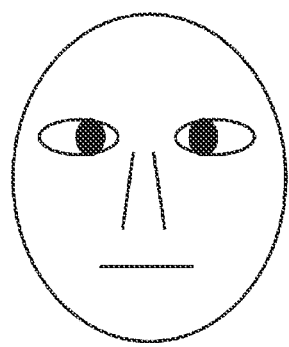
FIGS. 5A to 5D are diagrams illustrating how a driver of the automobile is imaged.
Figure 5B:
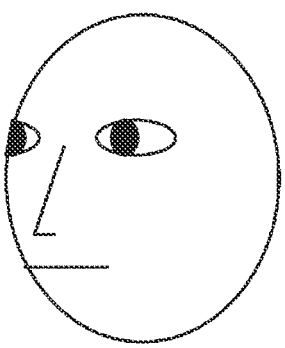

FIG. 5A is a front view of the head of a first driver. FIG. 5B is a perspective view of the head of the first driver in FIG. 5A.

When the driver faces a forward side in the automobile 1, the imaging sensor 41 provided at the center of the automobile 1 in the vehicle width direction images the head of the driver obliquely as in FIG. 5B rather than imaging a frontal view of the head as in FIG. 5A.

Figure 5C:
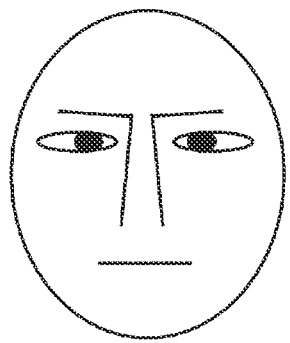
Figure 5D:
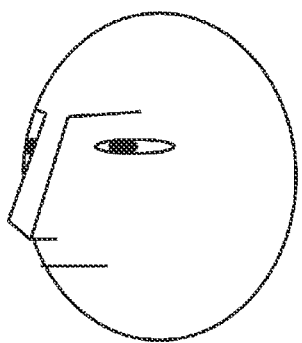

FIG. 5C is a front view of the head of a second driver. FIG. 5D is a perspective view of the head of the second driver in FIG. 5C.

When the driver faces the forward side in the automobile 1, the imaging sensor 41 provided at the center of the automobile 1 in the vehicle width direction images the head of the driver obliquely as in FIG. 5D rather than imaging a frontal view of the head as in FIG. 5C.

Unlike captured image data in FIG. 5B, captured image data in FIG. 5D indicates that the right eye of the driver is hidden by the long nose of the driver and the image shows an iris.

In this case, it may be difficult for the monitoring controller 36 to determine whether the right eye of the driver is open or closed based on the captured image data in FIG. 5D. Particularly when a distorted image is captured unlike the undistorted image in FIG. 5D, it may be difficult for the monitoring controller 36 to determine whether the right eye of the driver is open or closed based on the captured image data in FIG. 5D.

Since the captured image data in FIG. 5D does not include an image component showing the white of the right eye of the driver enough to determine the conditions of the driver, it may be difficult for the monitoring controller 36 to extract the right eye condition based on the captured image data in FIG. 5D. When the monitoring controller 36 cannot determine the right eye, there is a possibility that the monitoring controller 36 cannot determine, for example, the direction of the head of the driver. For example, when the area of the head in the image is determined based on a positional relationship between the eyes and the nose and a positional relationship between the eyes and the mouth, there is a possibility that the monitoring controller 36 cannot determine the direction of the head of the driver based on the captured image data in FIG. 5D. Without reference data for the head of the driver, there is a strong possibility that the monitoring controller 36 cannot correctly estimate the conditions of the driver when the image component does not include the right eye of the driver.

The case of FIG. 5D may easily occur when the imaging sensor 41 of the camera module 31 is provided at the center of the automobile 1 in the vehicle width direction.

As described above, the occupants have individual differences such as big eyes, small eyes, projecting eyes, and sunken eyes.

The actual position of the head of the driver may move not only in an angle-of-view direction corresponding to the vehicle width direction, but also in a vertical direction. Considering those movements, it may be difficult to correctly estimate the conditions of the head and eyes of the driver based on current captured image data obtained by the imaging sensor 41.

Figure 6:
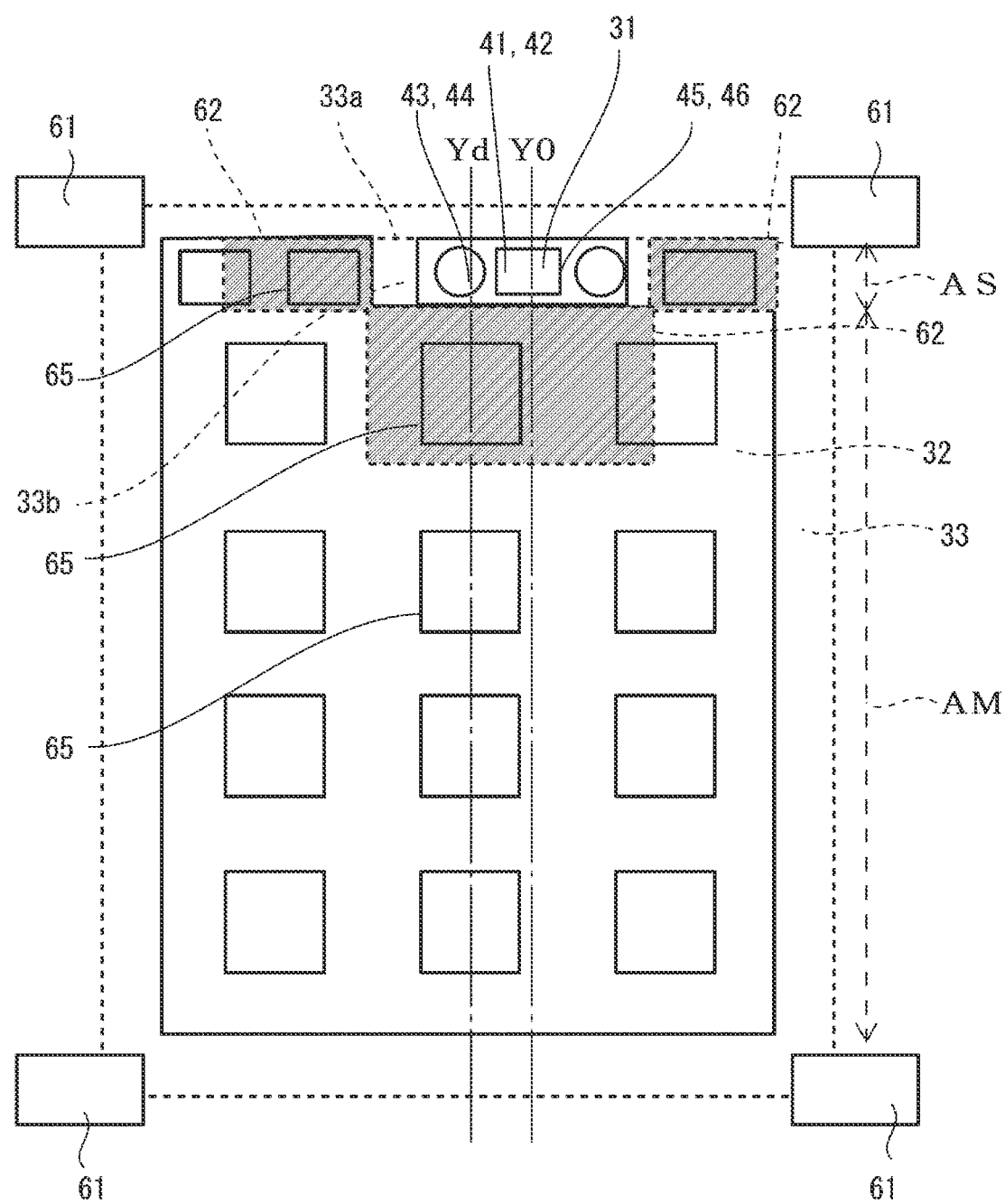
FIG. 6 is a diagram illustrating details of the liquid crystal device and the camera module of the occupant monitoring device at the center of a body in a vehicle width direction.

FIG. 6 is a diagram illustrating details of the liquid crystal device 32 and the camera module 31 of the occupant monitoring device 15 at the center of the body 2 in the vehicle width direction. FIG. 6 is a front view of the liquid crystal device 32 and the camera module 31 from the cabin 3. In FIG. 6, the center position Yd of the display operation panel 33 of the liquid crystal device 32 is shifted toward the passenger, that is, leftward in FIG. 6 relative to the center position Y0 of the body 2 in the vehicle width direction.

The liquid crystal device 32 including the display operation panel 33 is retained by resin retainers 61 at four corners of the peripheral edge of the display operation panel 33.

The outer dimension of the display operation panel 33 is larger than that of the liquid crystal device 32.

The display surface of the liquid crystal device 32 serving as a screen display area is not quadrangular but is substantially recessed by cutting out the center of the upper edge of the quadrangle unlike general monitors. A non-display area 33b that is a cutout portion is present on an inner side of a rectangular frame 33a circumscribing the substantially recessed display area of the liquid crystal device 32. The display area of the liquid crystal device 32 is present at the right and left across the non-display area 33b. The non-display area 33b is axially symmetrical across the center position Yd of the display operation panel 33 of the liquid crystal device 32.

As described above, the non-display area 33b is the cutout portion at the center of the upper edge of the screen display area on the inner side of the rectangular frame 33a circumscribing the display area on the display operation panel 33 that displays the screen of the liquid crystal device 32. On the display operation panel 33, the non-display area 33b is a cutout portion along the upper edge of the screen display area. On the display operation panel 33, the non-display area 33b is present at least in a range from the center position Yd of the screen display area in the vehicle width direction to the center position Y0 of the automobile 1 in the vehicle width direction.

On the display operation panel 33, the non-display area 33b is bilaterally symmetrical in the vehicle width direction of the automobile 1 across the center position Yd of the screen display area in the vehicle width direction.

The display area of the display operation panel 33 includes restricted areas 62 where swiping toward the camera module 31 is prohibited. The restricted areas 62 are provided at the right and left of and below the non-display area 33b where the camera module 31 is disposed.

On the back of the display operation panel 33, the camera module 31 including the imaging sensor 41 is disposed on the back of the non-display area 33b above the display area of the liquid crystal device 32. The camera module 31 is provided on an inner side of the retainers 61 that retain the four corners of the display operation panel 33 without projecting outward beyond the retainers 61.

For example, the camera module 31 is provided so that the imaging sensor 41 and the wide-angle imaging lens 42 are positioned between the center position Yd of the display operation panel 33 of the liquid crystal device 32 and the center position Y0 of the body 2 in the vehicle width direction. Therefore, the center positions of the imaging sensor 41 and the wide-angle imaging lens 42 in the vehicle width direction are between the center position Yd of the display operation panel 33 of the liquid crystal device 32 and the center position Y0 of the body 2 in the vehicle width direction.

Thus, the imaging sensor 41 of the camera module 31 appears to be provided on the liquid crystal device 32. The imaging sensor 41 adjoins the display area of the operation screen of the display operation panel 33 that displays the operation screen on the liquid crystal device 32.

As a result, the imaging sensor 41 of the camera module 31 can image the occupant from the back of the liquid crystal device 32 including the display operation panel 33.

In the camera module 31, the imaging sensor 41 and the wide-angle imaging lens 42 are disposed at the center in the vehicle width direction. The first LED 43 and the first light projection lens 44 are disposed at an end near the passenger's seat. The second LED 45 and the second light projection lens 46 are disposed at an end near the driver. Thus, the camera module 31 can capture images by projecting light without being obstructed by an object such as a steering wheel 7 between the driver and the dashboard 5.

When the camera module 31 is provided on the back of the display operation panel 33, the wide-angle imaging lens 42, the first light projection lens 44, and the second light projection lens 46 may be provided by processing the display operation panel 33.

Figure 7:
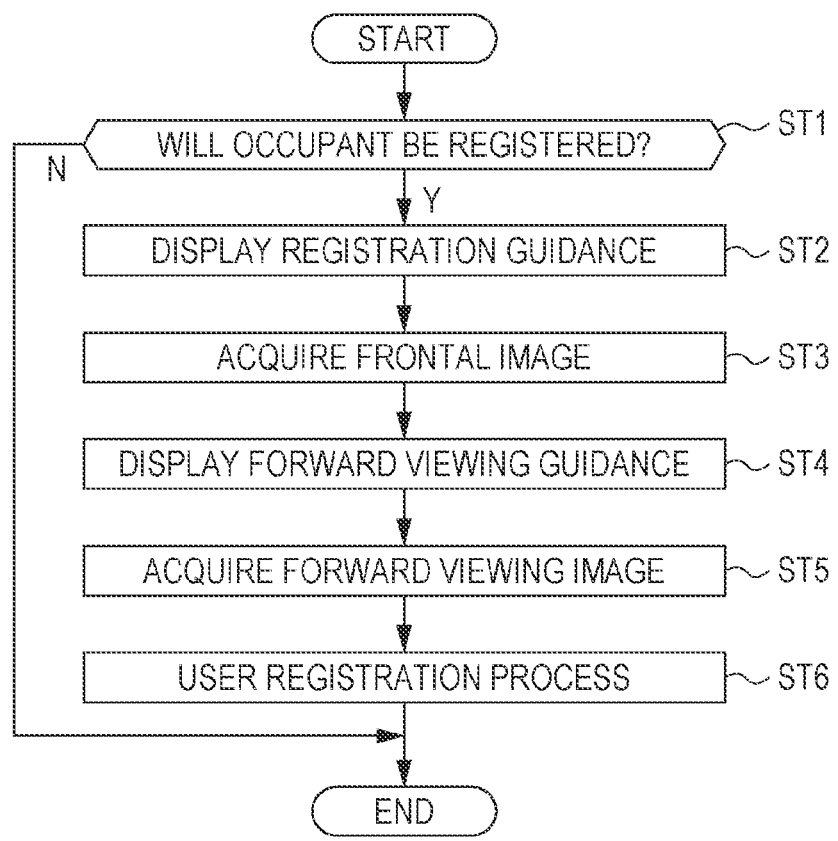
FIG. 7 is a flowchart of occupant registration control to be executed by a monitoring controller in FIG. 3.

FIG. 7 is a flowchart of occupant registration control to be executed by the monitoring controller 36 in FIG. 3.

The monitoring controller 36 may repeat the registration control in FIG. 7 when a new occupant gets into the automobile 1.

In Step ST1, the monitoring controller 36 first determines whether an occupant will be registered.

For example, the monitoring controller 36 determines that an occupant will be registered when the occupant has operated an occupant registration button on a menu screen displayed on the liquid crystal device 32. Then, the monitoring controller 36 advances the process to Step ST2. In the other case, the monitoring controller 36 determines that no occupant will be registered, and terminates the registration control in FIG. 7.

In Step ST2, the monitoring controller 36 executes the registration process for the new occupant. The monitoring controller 36 first causes the liquid crystal device 32 to display occupant registration start guidance. The occupant who is going to register the occupant by operating the occupant registration button on the menu screen may be viewing the displayed guidance while facing the liquid crystal device 32. With the guidance, the monitoring controller 36 may instruct the occupant to bring his/her face to a position in front of the liquid crystal device 32. The monitoring controller 36 turns ON the first LED 43 and the second LED 45 of the camera module 31. Thus, infrared rays are radiated onto either one of the upper body and the head of the occupant facing the liquid crystal device 32 to view the displayed guidance.

In Step ST3, the monitoring controller 36 acquires current captured image data from the imaging sensor 41, and acquires, as a frontal image, an image component in the captured image data showing a frontal view of the occupant to be newly registered. When a plurality of occupants can be extracted from the image captured by the imaging sensor 41, the monitoring controller 36 may prompt the occupant to select one of the occupants. The frontal image is expected to include infrared image components of the eyes, nose, and mouth of the occupant with high probability. The infrared image components may include vein patterns of the head and eyeballs. Depending on the number of extracted features, the vein patterns of the head and eyeballs can be used for identifying individuals. The vein patterns of the head and eyeballs are hardly affected by a light and dark pattern caused by either one of the shape of the surface of the head and the bumps and dips and the shape of the face. The vein pattern of the eyeball may extend from the white of the eye on the periphery to the iris at the center. A vein pattern of the eyelid that covers the eyeball differs from the vein pattern of the eyeball. The monitoring controller 36 may extract information on the vein patterns of the head, eyeballs, and eyelids from the captured image data. The image component showing the frontal view of the head of the occupant is expected to include the image components of the parts of the head with high image quality.

The monitoring controller 36 may repeat either one of the guidance and the acquisition of the current captured image data from the imaging sensor 41 until the monitoring controller 36 determines that the frontal image includes the infrared image components of the eyes, nose, and mouth of the occupant.

In Step ST4, the monitoring controller 36 causes the liquid crystal device 32 to display forward viewing guidance that prompts the occupant to view the forward side in the automobile 1. The occupant may view the forward side in the automobile 1 based on the guidance displayed on the liquid crystal device 32. The monitoring controller 36 turns ON the first LED 43 and the second LED 45 of the camera module 31. Thus, infrared rays are radiated onto either one of the upper body and the head of the occupant viewing the forward side in the automobile 1.

In Step ST5, the monitoring controller 36 acquires current captured image data from the imaging sensor 41, and acquires, as a forward viewing image, an image component in the captured image data showing the occupant viewing the forward side. The forward viewing image may include infrared image components of the eyes, nose, and mouth of the occupant at angles different from those in the frontal image. The forward viewing image obtained by using the infrared rays may include the vein patterns of the head and eyeballs of the occupant viewing the forward side. The monitoring controller 36 may extract information on the vein patterns of the head, eyeballs, and eyelids from the captured image data.

The image component showing the head of the occupant viewing the forward side is expected to include, with high image quality, the image components of the parts of the head of the occupant viewing the forward side without drowse and inattentive driving. The image components of the parts of the head of the occupant viewing the forward side are appropriately associated with the image components of the parts of the head in the frontal view. For example, when there is an image of the head of a drowsing occupant viewing the forward side, image components of parts of the head of the drowsing occupant in a frontal view can be obtained by executing a process similar to that in a case where image components of the parts of the head of the occupant viewing the forward side without drowse and inattentive driving are converted into image components of the parts of the head in the frontal view. The image components of the parts of the head in the frontal view may indicate with high probability that the occupant is drowsing. This process can reduce the possibility of determination that the occupant is not drowsing in a case of a process executed uniformly irrespective of features of the occupant.

In Step ST6, the monitoring controller 36 executes a user registration process.

In the user registration process, the monitoring controller records the two captured occupant images as registered captured image data together with identification information unique to the occupant. Thus, the memory 35 records occupant data including the registered captured image data of the new occupant. In one example, the memory 35 may serve as the recorder to record, as captured image data of each occupant, captured image data obtained by imaging the occupant by the imaging sensor 41 while the predetermined screen is displayed on the liquid crystal device 32. The registered captured image data recorded in the memory 35 for the occupant includes the frontal image and the forward viewing image of the occupant.

Figure 8:
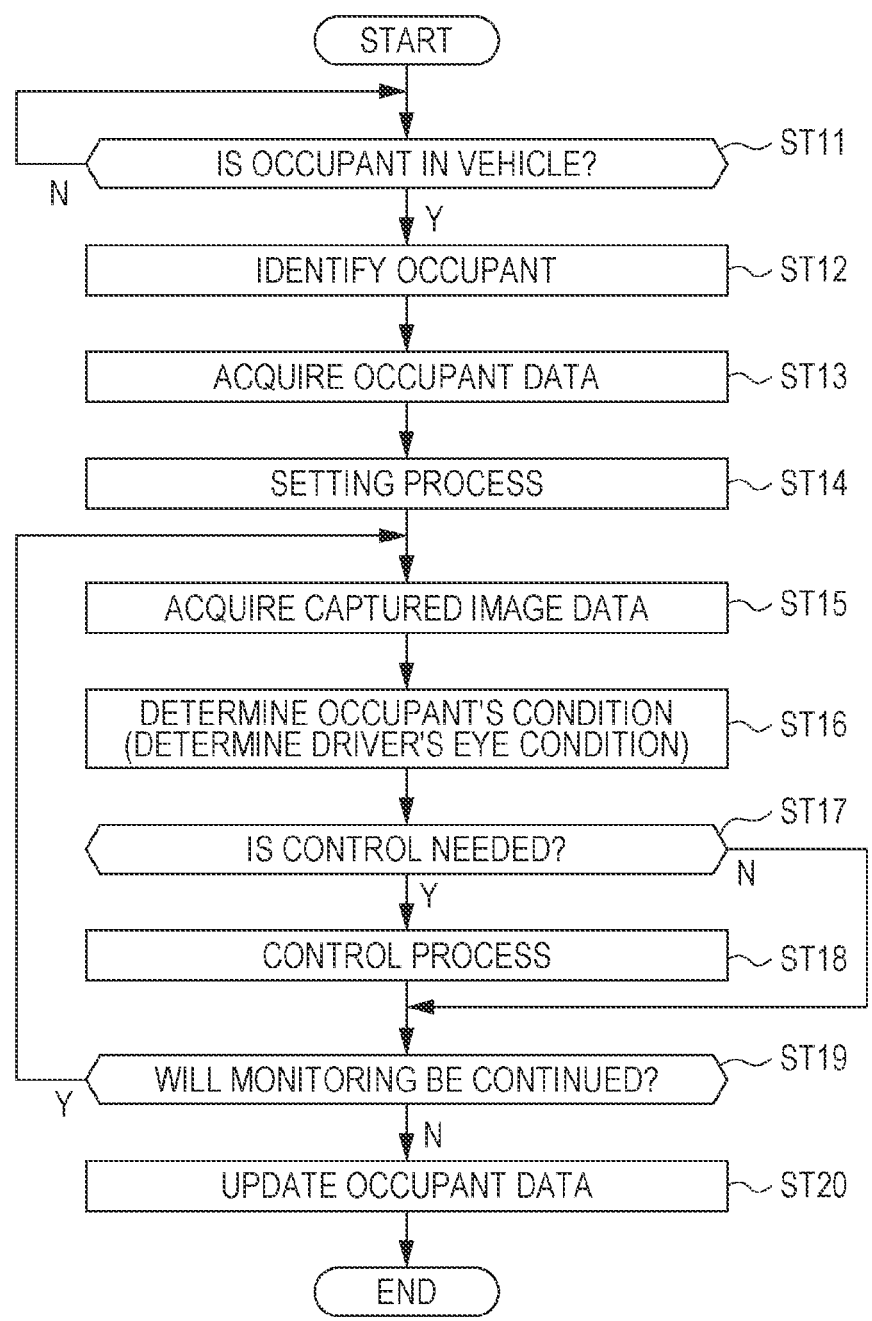
FIG. 8 is a flowchart of occupant monitoring control to be executed by the monitoring controller in FIG. 3.

FIG. 8 is a flowchart of occupant monitoring control to be executed by the monitoring controller 36 in FIG. 3.

For example, the monitoring controller 36 may repeat the monitoring control in FIG. 8 in a period in which the occupant is riding the automobile 1.

In Step ST11, the monitoring controller 36 determines whether an occupant is in the automobile 1. For example, the monitoring controller 36 may determine whether an occupant is in the automobile 1 based on either one of an image obtained by the imaging sensor 41 and detection of door opening or closing by the door opening/closing sensor 11. When an occupant is in the automobile 1, the monitoring controller 36 advances the process to Step ST12. When no occupant is in the automobile 1, the monitoring controller 36 repeats this process. When no occupant is in the automobile 1, the monitoring controller 36 may terminate the monitoring control in FIG. 8.

In Step ST12, the monitoring controller 36 starts the monitoring process for the riding occupant.

The monitoring controller 36 first identifies the riding occupant.

The monitoring controller 36 acquires a new captured image from the imaging sensor 41, extracts an image component of the riding occupant, and compares the image component with a plurality of pieces of occupant data registered in the memory 35.

At this time, the monitoring controller 36 may make the comparison based on forward viewing image components in the pieces of registered captured image data of occupants in the memory 35. The forward viewing image tends to include salient features of, for example, the nose of the face based on bumps and dips. Even through the comparison based on the forward viewing image components, a match of the occupant can be determined with high accuracy. The monitoring controller 36 may compare the features extracted from the images instead of directly comparing the images.

When the registered captured image data in any occupant data registered in the memory 35 has a match at a predetermined probability or higher, the monitoring controller 36 may determine that the riding occupant is an occupant of the registered captured image data.

In this case, the monitoring controller 36 identifies the riding occupant as an occupant identified through the comparison with the plurality of pieces of occupant data registered in the memory 35.

When the registered captured image data having a match at the predetermined probability or higher is not present in the plurality of pieces of occupant data registered in the memory 35, the monitoring controller 36 may identify the riding occupant as an unregistered occupant.

In Step ST13, the monitoring controller 36 acquires the occupant data of the identified occupant.

In Step ST14, the monitoring controller 36 executes a setting process by using the acquired occupant data. When the occupant data includes various types of setting data on settings made by the occupant, the monitoring controller 36 executes the setting process based on the setting data. The monitoring controller 36 outputs information on the setting data to the individual parts of the automobile 1. Thus, processes are executed on, for example, a position of the occupant's seat, an initial setting about ON/OFF of driving assistance, preferences on autonomous driving, a server to be used, and settings about occupant protection and air conditioning.

For example, the monitoring controller 36 determines whether a child bucket seat is set on the passenger's seat 4 based on the acquired latest captured image data. When the child bucket seat is set, the monitoring controller 36 makes a setting for prohibiting inflation of the airbag toward the passenger's seat 4.

In Step ST15, the monitoring controller 36 starts the monitoring process for the identified occupant. The monitoring controller 36 first acquires the latest captured image data from the imaging sensor 41.

In Step ST16, the monitoring controller 36 determines image components of the upper body and the head of the occupant in the latest captured image data. The monitoring controller 36 determines the image components of the upper body and the head of the identified occupant in the latest captured image data by using, as a reference, image components in the registered captured image data of the occupant in the memory 35. For example, the monitoring controller 36 may estimate a frontal image of the occupant in the current captured image data obtained by the imaging sensor 41 based on a difference between a frontal image and a forward viewing image of the occupant registered in the memory 35, and determine conditions of the occupant in the automobile 1 based on the image components in the estimated frontal image of the occupant. For example, the monitoring controller 36 may correct lens distortion and direction of the occupant image in the current captured image data by using the registered frontal image of the occupant, and estimate the frontal image of the occupant in the current captured image data.

When the registered captured image data is not found, the monitoring controller 36 may determine the image components of the upper body and the head of the occupant in the latest captured image data by using, as a reference, image components in standard registered captured image data in the memory 35.

Examples of the conditions of the occupant to be determined by the monitoring controller 36 in the latest captured image data include a direction of the head, a direction of the line of sight, and whether the eyes are open or closed. The monitoring controller 36 may determine pulsation in a vein. For example, when the eyes of the driver are closed, the direction of the line of sight is not the forward direction, the direction of the head is not the forward direction, or the pulsation is high, the monitoring controller 36 determines that the driver is not in a state appropriate for driving. In the other cases, the monitoring controller 36 may determine that the driver is in the state appropriate for driving.

In this way, the monitoring controller 36 determines the conditions of the occupant in the automobile 1 by using the registered captured image data recorded in the memory 35 as the reference data. In one embodiment, the monitoring controller 36 may serve as a "determiner".

The monitoring controller 36 determines at least one of the line of sight of the driver or whether the eyes of the driver are open or closed as the conditions of the driver in the automobile 1. Since the registered captured image data having high image quality can be used as the reference, the monitoring controller 36 can acquire not only the information on whether the eyes are open or closed but also, depending on the occupant, information on a change in the imaging condition of either one of the iris and the white of the eye between the top and bottom eyelids. Thus, an eye expression such as the direction of the line of sight of the occupant can be determined with high accuracy.

If similar determination is attempted without using the registered captured image data of each occupant, the eye expression such as the direction of the line of sight of the occupant is determined, including individual differences such as the size of the eyes. It may be difficult to determine the eye expression of each individual with high accuracy. Excessive alert may be output based on the body feature of the occupant. The occupant may become uncomfortable.

In Step ST17, the monitoring controller 36 determines whether control on, for example, traveling of the automobile 1 is needed based on a result of the determination of the conditions of the occupant such as the driver. For example, when determination is made that the driver is not in the state appropriate for driving, the monitoring controller 36 determines that the control is needed, and advances the process to Step ST18. In the other cases, for example, when all the occupants including the driver are in a state appropriate for traveling, the monitoring controller 36 determines that the control is not needed, and advances the process to Step ST19 while skipping Step ST18.

In Step ST18, the monitoring controller 36 controls, for example, the traveling of the automobile 1.

For example, when determination is made that the direction of the line of sight of the driver is not the forward direction or the direction of the head is not the forward direction, the monitoring controller 36 alerts the driver. For example, the driver may be alerted by displaying alert on the liquid crystal device 32 or outputting alert sound from the loudspeaker device 14. When determination is made that the driver does not view the forward side, that is, the line of sight of the driver is not yet the forward direction though the alert is output, the monitoring controller 36 switches the traveling mode of the automobile 1 to the autonomous driving to decelerate or stop the traveling of the automobile 1. When decelerating or stopping the traveling of the automobile 1, the monitoring controller 36 may turn ON a hazard warning signal lamp (not illustrated) or transmit emergency information by the external communication device 18.

For example, when determination is made that the driver is drowsing or the pulsation is high, the monitoring controller 36 alerts the driver or decelerates or stops the traveling of the automobile 1. When decelerating or stopping the traveling of the automobile 1, the monitoring controller 36 may turn ON the hazard warning signal lamp (not illustrated) or transmit the emergency information by the external communication device 18.

When the driver is continuously driving for a predetermined period or longer, the eyes are opened and closed at a predetermined frequency, or the head tends to bend downward, the monitoring controller 36 may determine in Step ST17 that the control is needed, and prompt the driver to, for example, take a rest.

In Step ST19, the monitoring controller 36 determines whether to continue the occupant monitoring control. For example, the monitoring controller 36 may determine whether the occupant gets out of the automobile 1 based on either one of an image obtained by the imaging sensor 41 and detection of door opening or closing by the door opening/closing sensor 11. When the occupant gets out of the automobile 1, the monitoring controller 36 determines not to continue the occupant monitoring control, and advances the process to Step ST20. In the other cases, the monitoring controller 36 determines to continue the occupant monitoring control, and returns the process to Step ST15. The monitoring controller 36 repeats the process from Step ST15 to Step ST19 until the monitoring controller 36 determines not to continue the occupant monitoring control.

In Step ST20, the monitoring controller 36 updates the occupant data registered in the memory 35 as data of the recognized occupant in a process when the occupant gets out of the automobile 1. When the occupant gets out of the automobile 1, the monitoring controller 36 acquires setting information from the individual parts of the automobile 1, and updates the occupant data registered in the memory 35. Thus, the occupant data registered in the memory 35 reflects the occupant's preferences. When the occupant gets in the automobile 1 next time, the latest occupant's settings are made automatically.

The monitoring controller 36 may temporarily record occupant data of an unregistered occupant in the memory 35. When the occupant performs the registration operation later on, the settings can be linked immediately.

As described above, in the occupant monitoring device 15 of this embodiment, the camera module 31 including the imaging sensor 41 is disposed on the back of the display operation panel 33 of the liquid crystal device 32 at the center of the automobile 1 in the vehicle width direction. Therefore, the conditions of the driver and the passenger can be monitored by imaging the driver and the passenger by the single imaging sensor 41. The camera module 31 including the imaging sensor 41 is disposed near the display operation panel 33 of the liquid crystal device 32, and the conditions are determined by using pre-captured frontal image data of the occupant in addition to the current captured image data of the occupant. Therefore, the effect of an imaging direction and an imaging position of the occupant can be reduced, and the conditions of the occupant can be determined with higher probability than in a case where the conditions are determined based on the current captured image data.

Next, description is made about response control for an occupant's operation on the liquid crystal device 32 including the display operation panel 33 that can be used for the occupant monitoring.

Figure 9:
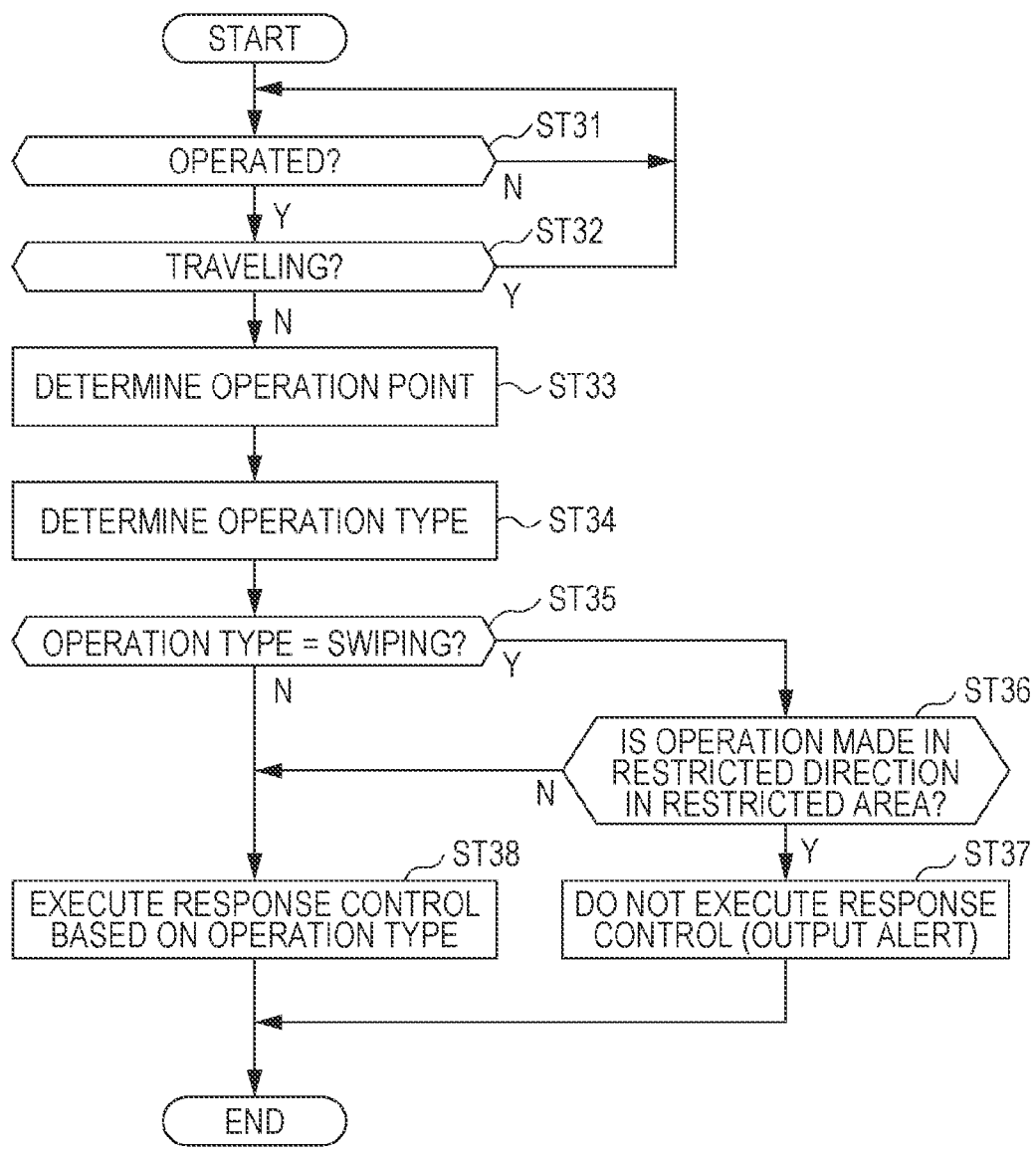
FIG. 9 is a flowchart of response control for an operation on the display operation panel in FIG. 3 that is provided at the center of the body in the vehicle width direction and used for the monitoring control.

FIG. 9 is a flowchart of the response control for the operation on the display operation panel 33 in FIG. 3 that is provided at the center of the body 2 in the vehicle width direction and used for the monitoring control.

The monitoring controller 36 of the occupant monitoring device 15 repeats the process of FIG. 9 to detect the occupant's operation on the display operation panel 33 of the liquid crystal device 32.

An ECU of any other device of the vehicle that is coupled to the occupant monitoring device 15, for example, an ECU of any other device illustrated in FIG. 2 may acquire information on the occupant's operation on the display operation panel 33 of the liquid crystal device 32 via the monitoring controller 36 and repeats the process of FIG. 9.

As illustrated in FIG. 6, the display area of the display operation panel 33 includes the restricted areas 62 where swiping toward the camera module 31 is prohibited. The restricted areas 62 are provided at the right and left of and below the non-display area 33b where the camera module 31 is disposed.

In Step ST31, the monitoring controller 36 determines whether the display operation panel 33 of the liquid crystal device 32 is operated by the occupant. When the occupant's operation is not detected, the monitoring controller 36 continues this process. When the occupant's operation is detected, the monitoring controller 36 advances the process to Step ST32.

In Step ST32, the monitoring controller 36 determines whether the automobile 1 is traveling as an operation environment. When the automobile 1 is traveling, the monitoring controller 36 returns the process to Step ST31 to prohibit the operation on the display operation panel 33.

When the automobile 1 is not traveling, the monitoring controller 36 advances the process to Step ST33.

The monitoring controller 36 may further determine whether the display operation panel 33 is operated by the driver as the operation environment. In this case, the monitoring controller 36 may return the process to Step ST31 when the display operation panel 33 is operated by the driver, and advance the process to Step ST33 when the display operation panel 33 is operated by the passenger.

In Step ST33, the monitoring controller 36 determines an occupant's operation point in the display area of the display operation panel 33 of the liquid crystal device 32. For example, as illustrated in FIG. 6, the display area of the display operation panel 33 includes a main display area AM and a subordinate display area AS. The subordinate display area AS may be set at the right and left of the non-display area 33b. In the main display area AM, a plurality of operation objects 65 such as operation buttons can be displayed for various settings. In the subordinate display area AS, operation objects 65 can be displayed for a current time and various conditions of the automobile 1.

The liquid crystal device 32 can display a plurality of swipeable operation objects 65 on the operation screen. The monitoring controller 36 may determine which of the displayed operation objects 65 is operated to determine the operation point.

In Step ST34, the monitoring controller 36 determines the type of the occupant's operation. For example, the occupant may click or swipe on the operation objects 65 displayed in the display area of the display operation panel 33 of the liquid crystal device 32. The monitoring controller 36 may determine whether the occupant's operation type is clicking or swiping based on either one of the operation point determined in Step ST33 and the position of the operation object 65. The monitoring controller 36 may determine an operation direction of swiping from the operation point toward the position of the imaging camera on the surface of the display operation panel 33.

In Step ST35, the monitoring controller 36 determines whether the operation type is swiping on the surface of the display operation panel 33. When the operation type determined in Step ST35 is swiping, the monitoring controller 36 advances the process to Step ST36. When the operation type determined in Step ST34 is not swiping, the monitoring controller 36 advances the process to Step ST38.

In Step ST36, the monitoring controller 36 determines whether the swiping is made in a swiping-restricted direction in a swiping-restricted area. As illustrated in FIG. 6, the display area of the display operation panel 33 includes the restricted areas 62 where swiping toward the camera module 31 is prohibited. The restricted areas 62 are provided at the right and left of and below the non-display area 33b where the camera module 31 is disposed. The monitoring controller 36 determines whether the swiping is made toward the camera module 31. When the swiping is made toward the camera module 31, the monitoring controller 36 advances the process to Step ST37. In the other cases, the monitoring controller 36 advances the process to Step ST38.

As illustrated in FIG. 6, the determination for the operation object 65 partially overlapping the restricted area 62 may be made similarly to either one of the operation object 65 in the restricted area 62 and the operation object 65 outside the restricted area 62. For example, when sufficiently wide restricted areas 62 are set around the camera module 31, the determination may be made similarly to the operation object 65 outside the restricted area 62.

The pattern of the restricted areas 62 is not limited to the pattern in FIG. 6.

In Step ST37, the monitoring controller 36 avoids executing the response control for the occupant's operation based on the operation point and the operation type. When the occupant's operation type is swiping toward the imaging sensor 41 in the display area around the imaging sensor 41, the monitoring controller 36 avoids executing the control based on the operation type. For example, the monitoring controller 36 may output, to the liquid crystal device 32, an alert window indicating that the response control for the operation is not executed.

Then, the monitoring controller 36 terminates this control.

In Step ST38, the monitoring controller 36 executes the response control for the occupant's operation based on the operation point and the operation type.

For example, when the occupant's operation is clicking on the displayed object, the monitoring controller 36 executes response control associated with the operation in advance. For example, the monitoring controller 36 may cause the liquid crystal device 32 to display an execution screen for the operated object.

For example, when the occupant's operation is swiping on the displayed object, the monitoring controller 36 executes response control associated with the operation in advance. For example, the monitoring controller 36 may cause the liquid crystal device 32 to display a setting screen for the operated object.

As described above, when swiping toward the position of the imaging sensor 41 is made on the operation object 65 displayed around the imaging sensor 41, the monitoring controller 36 avoids executing the control based on the swiping. When swiping is made on the operation object 65 displayed at a position other than the periphery of the imaging sensor 41 or when swiping is made around the imaging sensor 41 but toward a portion other than the imaging sensor 41, the monitoring controller 36 executes the control based on the swiping.

In the embodiment described above, when the occupant's operation type is at least the operation involving the movement toward the imaging sensor 41, the monitoring controller 36 avoids executing the control based on the determined operation type. Thus, the occupant in the automobile 1 may refrain from the operation involving the movement toward the imaging sensor 41 on the liquid crystal device 32 that displays the operation screen for the occupant. In this embodiment, the field of view of the imaging sensor 41 is hardly obstructed by the movement of any one of the finger, hand, arm, and elbow during the occupant's operation. Since an operation involving movement that is not directed to the imaging sensor 41 is not restricted, the occupant can make the operation on the operation screen displayed on the liquid crystal device 32.

In the embodiment described above, the occupant's swiping is not restricted in any case. Therefore, the liquid crystal device 32 that displays the operation screen and is used for monitoring the occupants in combination with the imaging sensor can achieve both the usability for the occupants and the monitoring of the occupants' conditions with good balance. In the automobile 1, the liquid crystal device 32 to be used for monitoring the occupants can satisfactorily achieve both the usability for the occupants and the monitoring of the occupants' conditions.

The embodiment described above is an exemplary embodiment of the disclosure, but the embodiment of the disclosure is not limited to this embodiment, and various modifications and changes may be made without departing from the gist of the disclosure.

In the embodiment described above, the liquid crystal device 32 is disposed in the vertically oriented posture.

For example, the liquid crystal device 32 may be disposed in a horizontally oriented posture.

Figure 10:
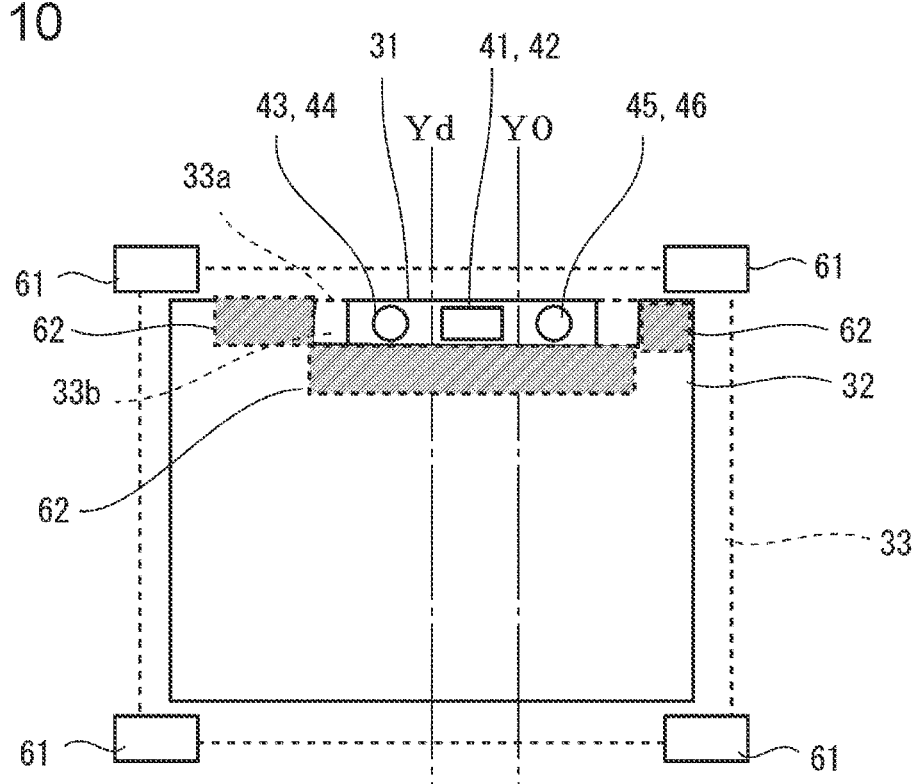
FIG. 10 is a diagram illustrating a first modified example of the liquid crystal device and the camera module of the occupant monitoring device at the center of the body in the vehicle width direction in FIG. 6.

FIG. 10 is a diagram illustrating a first modified example of the liquid crystal device 32 and the camera module 31 of the occupant monitoring device 15 at the center of the body 2 in the vehicle width direction in FIG. 6.

In FIG. 10, the display area of the liquid crystal device 32 is oriented horizontally.

On the back of the display operation panel 33, the camera module 31 including the imaging sensor 41 is disposed on the back of the non-display area 33b above the display area of the liquid crystal device 32. The camera module 31 is provided on the inner side of the retainers 61 that retain the four corners of the display operation panel 33 without projecting outward beyond the retainers 61.

Also in this case, the restricted areas 62 where swiping toward the camera module 31 is prohibited are set in the display area of the display operation panel 33 at the right and left of and below the non-display area 33b where the camera module 31 is disposed. Thus, effects similar to those in the embodiment described above can be attained.

Figure 11:
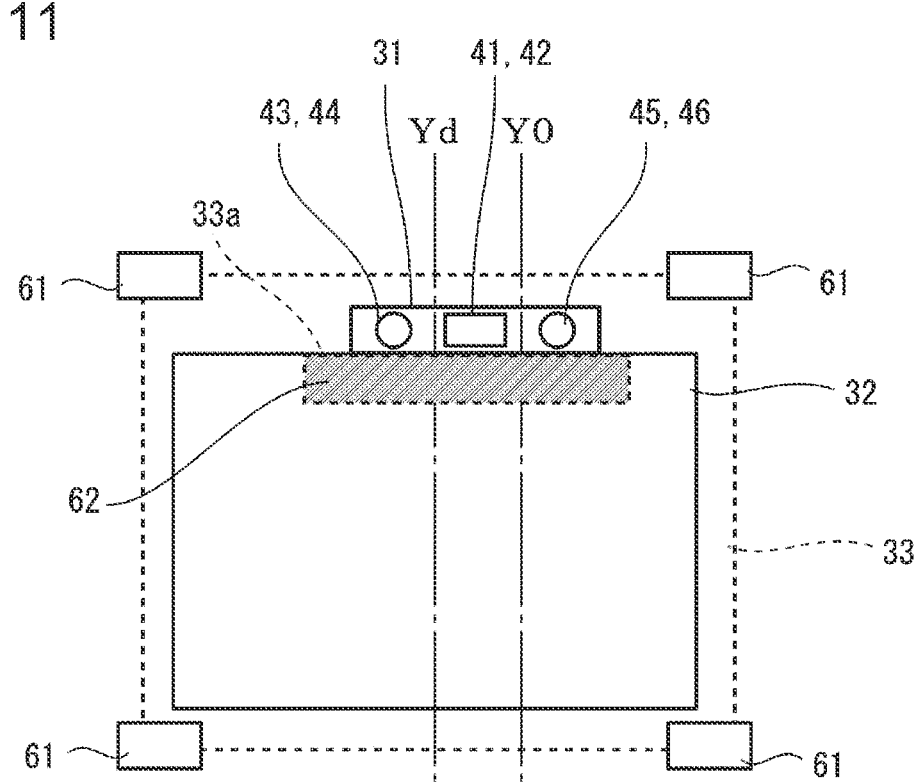
FIG. 11 is a diagram illustrating a second modified example of the liquid crystal device and the camera module of the occupant monitoring device at the center of the body in the vehicle width direction in FIG. 6.

FIG. 11 is a diagram illustrating a second modified example of the liquid crystal device 32 and the camera module 31 of the occupant monitoring device 15 at the center of the body 2 in the vehicle width direction in FIG. 6.

In FIG. 11, the display area of the liquid crystal device 32 is oriented horizontally.

On the back of the display operation panel 33, the camera module 31 including the imaging sensor 41 is disposed above the quadrangular display area of the liquid crystal device 32. The camera module 31 is provided on the inner side of the retainers 61 that retain the four corners of the display operation panel 33 without projecting outward beyond the retainers 61.

Also in this case, the restricted area 62 where swiping toward the camera module 31 is prohibited is set in the display area of the display operation panel 33 at the center of the upper part adjoining the camera module 31. Thus, effects similar to those in the embodiment described above can be attained.

In the embodiment described above, the display operation panel 33 of the liquid crystal device 32 and the imaging sensor 41 are disposed at the center of the automobile 1 in the vehicle width direction. The imaging sensor 41 has the wide-angle imaging lens 42 at the angle of view at which the heads of the plurality of occupants seated in the front row of the automobile can be imaged while being disposed at the center of the automobile 1 in the vehicle width direction. The monitoring controller 36 determines at least one of the line of sight of the occupant or whether the eyes of the occupant are open or closed as the conditions of the occupants in the automobile 1.

The occupant monitoring device may omit any one of the elements described above. For example, the occupant monitoring device may monitor the driver. Also in this case, the improvement in the probability of the monitoring determination is expected, for example, when the imaging sensor 41 is disposed on the back of the display operation panel 33 of the liquid crystal device 32 within a circumscribed circle of the image display area and the monitoring controller 36 determines the conditions of the occupant in the automobile 1 by using the registered captured image data recorded in the memory 35 as the reference data.

The occupant monitoring device 15 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the occupant monitoring device 15 including the monitoring controller 36. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. An occupant monitoring device for a vehicle, the occupant monitoring device comprising:
    a display configured to display an operation screen for an occupant in the vehicle;
    a controller configured to execute on a process corresponding to an operation type determined as an operation performed by the occupant on the operation screen of the display; and
    an imager including a camera module comprising an imaging sensor and an imaging lens disposed over the imaging sensor, the imager being configured to image the occupant in the vehicle,
    wherein the controller is configured to avoid executing the process corresponding to the determined operation type in a case where the operation type performed by the occupant on the operation screen at least involves movement toward the imager.

2. The occupant monitoring device for the vehicle according to claim 1,
    wherein the imager adjoins a display area of the display, and
    wherein the controller is configured to avoid executing the process corresponding to the determined operation type in a case where the operation type performed by the occupant involves the movement toward the imager in the display area around the imager.

3. The occupant monitoring device for the vehicle according to claim 1,
    wherein the display comprises a panel configured to display the operation screen and larger than a display area of the operation screen, and
    wherein the imager is provided on a back of the panel of the display.

4. The occupant monitoring device for the vehicle according to claim 2,
    wherein the display comprises a panel configured to display the operation screen and larger than a display area of the operation screen, and
    wherein the imager is provided on a back of the panel of the display.

5. The occupant monitoring device for the vehicle according to claim 1, wherein the controller is configured to avoid executing the process corresponding to the determined operation type in a case where the operation involving the movement toward the imager is an operation of swiping toward the imager on a surface of the display.

6. The occupant monitoring device for the vehicle according to claim 2, wherein the controller is configured to avoid executing the process corresponding to the determined operation type in a case where the operation involving the movement toward the imager is an operation of swiping toward the imager on a surface of the display.

7. The occupant monitoring device for the vehicle according to claim 1,
    wherein the display is configured to display swipeable operation objects on the operation screen, and
    wherein the controller is configured to, upon determining that swiping toward the imager is made on any one of the swipeable operation objects displayed around the imager, avoid executing the process corresponding to the determined swiping.

8. The occupant monitoring device for the vehicle according to claim 2,
    wherein the display is configured to display swipeable operation objects on the operation screen, and
    wherein the controller is configured to, upon determining that swiping toward the imager is made on any one of the swipeable operation objects displayed around the imager, avoid executing the process corresponding to the determined swiping.

9. The occupant monitoring device for the vehicle according to claim 5, wherein the controller is configured to:
    avoid executing the process corresponding to the determined operation type in a case where a direction of the operation of the swiping on the surface of the display is a direction to the imager; and
    execute the process corresponding to the determined operation type in a case where the direction of the operation of swiping on the surface of the display is a direction different from the direction to the imager.

10. The occupant monitoring device for the vehicle according to claim 7, wherein the controller is configured to:
    avoid executing the process corresponding to the determined operation type in a case where a direction of the operation of the swiping on the surface of the display is a direction to the imager; and
    execute the process corresponding to the determined operation type in a case where the direction of the operation of swiping on the surface of the display is a direction different from the direction to the imager.

11. The occupant monitoring device for the vehicle according to claim 1, wherein the controller is configured to avoid executing the process corresponding to the determined operation type in a case where the operation type of the occupant at least involves the movement toward the imager during traveling of the vehicle.

12. The occupant monitoring device for the vehicle according to claim 2, wherein the controller is configured to avoid executing the process corresponding to the determined operation type in a case where the operation type of the occupant at least involves the movement toward the imager during traveling of the vehicle.

13. The occupant monitoring device for the vehicle according to claim 1,
    wherein the display and the imager are provided at a center of the vehicle in a vehicle width direction, and
    wherein the controller is configured to monitor a condition of the occupant in the vehicle based on an image captured by the imager.

14. The occupant monitoring device for the vehicle according to claim 2,
- wherein the display and the imager are provided at a center of the vehicle in a vehicle width direction, and
- wherein the controller is configured to monitor a condition of the occupant in the vehicle based on an image captured by the imager.

15. An occupant monitoring device for a vehicle, the occupant monitoring device comprising:
- a display comprising a panel configured to display an operation screen for an occupant in the vehicle;
- an imager comprising including a camera module comprising an imaging sensor and an imaging lens disposed over the imaging sensor, the imager being configured to image the occupant in the vehicle; and
- circuitry configured to:
  - execute a process corresponding to an operation type determined as an operation performed by the occupant on the operation screen of the display; and
  - avoid executing the process corresponding to the determined operation type in a case where the operation type performed by the occupant on the operation screen at least involves movement toward the imager.

16. The occupant monitoring device for the vehicle according to claim 1,
- wherein the display comprises a panel having a front surface and a back surface opposite the front surface, the front surface having a first area and a second area adjacent to the first area, the display being configured to display an operation object in the first area,
- wherein the imager is disposed on the back surface of the second area of the panel, and
- wherein the controller is configured to determine that the operation type performed by the occupant on the operation screen at least involves the movement toward the imager based on detecting that the occupant swipes the front surface of the panel in a direction from a position of the operation object toward a position of the imager.

17. The occupant monitoring device for the vehicle according to claim 15,
- wherein the display comprises a panel having a front surface and a back surface opposite the front surface, the front surface having a first area and a second area adjacent to the first area, the display being configured to display an operation object in the first area,
- wherein the imager is disposed on the back surface of the second area of the panel, and
- wherein the controller is configured to determine that the operation type performed by the occupant on the operation screen at least involves the movement toward the imager based on detecting that the occupant swipes the front surface of the panel in a direction from a position of the operation object toward a position of the imager.

* * * * *